United States Patent

Plummer

[15] 3,660,744
[45] May 2, 1972

[54] SERVO CONTROL SYSTEMS

[72] Inventor: Dexter Robert Plummer, Leicester, England

[73] Assignee: The Rank Organization Limited, London, England

[22] Filed: Jan. 11, 1971

[21] Appl. No.: 105,703

Related U.S. Application Data

[63] Continuation of Ser. No. 797,560, Feb. 7, 1969, abandoned.

[30] Foreign Application Priority Data

Feb. 22, 1968 Great Britain.........................8,733/68

[52] U.S. Cl..............................................318/616, 318/618
[51] Int. Cl. .......................................................G05b 5/01
[58] Field of Search .....................318/616, 617, 618; 244/77

[56] References Cited

UNITED STATES PATENTS

| | | |
|---|---|---|
| 3,015,767 | 1/1962 | Taylor....................................318/617 |
| 3,114,869 | 12/1963 | Goodwin.................................318/618 |
| 3,122,687 | 2/1964 | Romuari..................................318/618 |
| 3,184,662 | 5/1965 | Wallace...................................318/618 |
| 3,246,220 | 4/1966 | Shinners..................................318/618 |
| 3,351,829 | 11/1967 | Quarnstrom........................318/162 X |
| 3,412,300 | 11/1968 | Westenskow............................318/618 |

Primary Examiner—Benjamin Dobeck
Attorney—Holcombe, Wetherill & Brisebois

[57] ABSTRACT

A servo control system comprises an actuator such as an electric motor which is operated in response to a demand signal and to a feedback signal representative of the actual actuator response. The feedback signal is derived by way of respective filters from two component signals representative of the actual response of the actuator and derived respectively from a transducer such as a tachometer generator coupled directly to the actuator and from the actuator itself. The filters are arranged so that the feedback signal contains a greater proportion of the component signal from the actuator within any frequency ranges in which mechanical resonance occurs in the system and a greater proportion of the component signal from the transducer within frequency ranges devoid of such mechanical resonance, so that the component signals substantially compensate each other at resonance and the resulting feedback signal is substantially free of resonance components.

7 Claims, 3 Drawing Figures

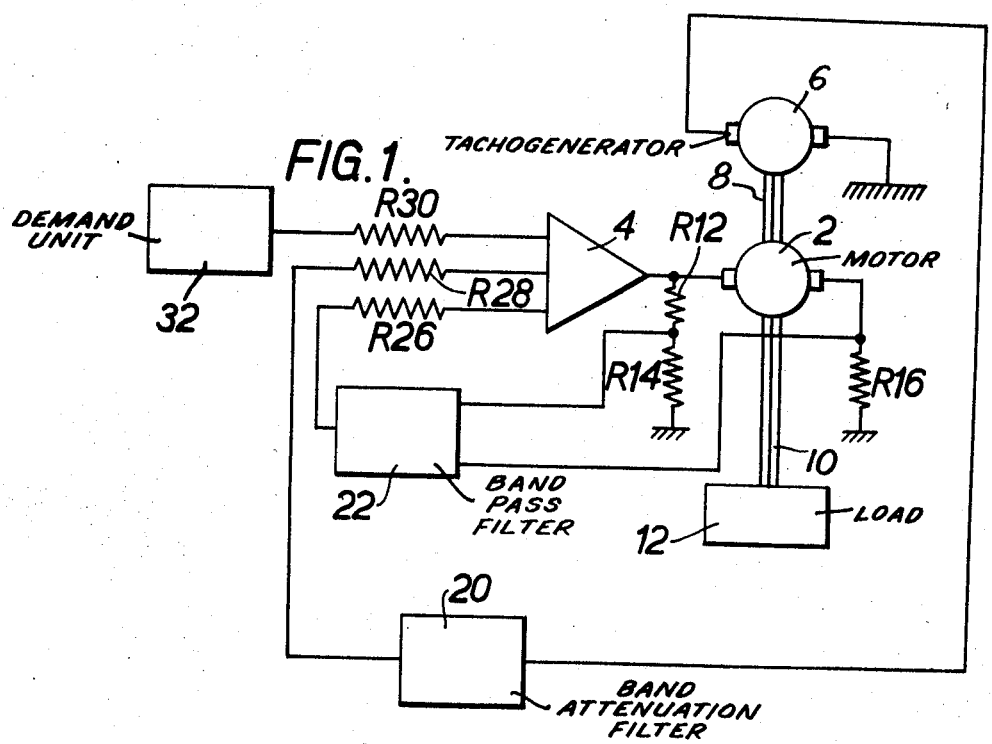
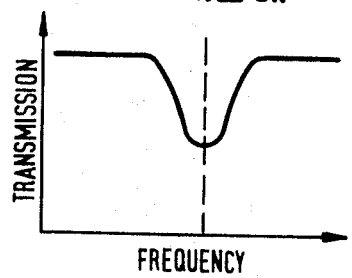
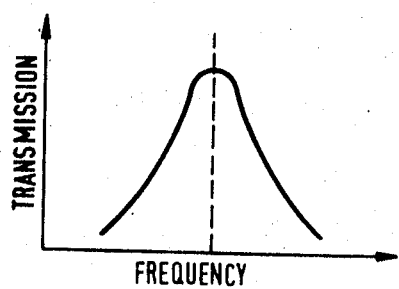

SERVO CONTROL SYSTEMS

This application is a continuation of Ser. No. 797,560, of Feb. 7, 1969, now abandoned.

This invention relates to servo control systems. Such systems generally comprise an actuator driven from a source which is responsive to a demand signal derived from a manually or otherwise operated demand unit and to a feedback signal representative of the movement of the actuator. The system may be a position responsive system wherein the feedback signal and the demand signal respectively are representative of the actual and the demanded position of the actuator, which tends to assume static equilibrium corresponding to the position demanded.

Alternatively the system may be a rate responsive system wherein the feedback signal and the demand signal respectively are representative of the actual rate and the demanded rate of movement of the actuator, which tends to assume dynamic equilibrium corresponding to the demanded rate of operation.

Where the servo system is a rate responsive system, the feedback signal is generally produced by a rate sensitive transducer such as a tachometer generator, mechanically coupled to the actuator and effective to produce a signal representative of the rate of operation of the actuator.

In such an arrangement, the mechanical coupling between the actuator and the transducer will have a finite compliance and will enter a resonant condition at a frequency dependent upon the mechanical properties of the system. Such mechanical resonance will produce a corresponding resonance component in the output signal from the transducer. The servo system will, of course, react to this unwanted component as well as to the feedback component, to cause spurious operation of the system.

Since such a servo system is a closed-loop system employing feedback, the effect of such resonance is relatively greater than that which would be produced by similar mechanical resonance in an open-loop control system producing the same degree of operation of an actuator. Stiffening, or suitably dampening the mechanical coupling, for example, by placing the transducer as close to the actuator as possible, cannot eliminate the resonance although it may lower the resonance amplitude or produce a shift in the frequency at which resonance occurs.

According to one aspect of the present invention, a servo control system comprises an actuator powered from a source which is responsive to a demand signal representative of the response demanded of the actuator and to a feedback signal representative of the actual actuator response, wherein the feedback signal is derived by way of filter means from two component signals representative of the actual response of the actuator and respectively derived from a transducer coupled directly to the actuator and from the actuator itself, the filter means being arranged so that the feedback signal contains a greater proportion of the component signal from the actuator within any frequency ranges in which mechanical resonance occurs in the system and a greater proportion of the component signal from the transducer within frequency ranges devoid of such mechanical resonance.

Preferably the component signals are so combined that they substantially complement each other at resonance so that the resulting feedback signal is substantially free of resonance components.

Within frequency ranges containing mechanical resonances, the component signals are preferably combined with relative magnitudes which are in the inverse ratio of the inertias of the actuator and the inertia, or referred inertia as herein defined, of the transducer.

In the context of the present specification, the term "referred inertia" of the transducer is defined as the effective inertia of the transducer, where the latter is indirectly rather than directly coupled to the actuator, for example, by way of suitable gearing.

Where the servo system is a rate responsive electrical system, the actuator may comprise an electric motor, the component signal which is derived from the actuator itself being constituted by or derived from the back e.m.f. of the motor. Conveniently, a further signal representative of the rate of rotation of the motor is derived from a tachometer generator or like rate responsive device which is mechanically coupled to the motor to move therewith.

Preferably the feedback signal is constituted wholly by the component signal from the tachometer generator in the frequency ranges devoid of mechanical resonance.

Where the system is electrical the component signals may be combined by means of a summing circuit comprising suitably graded resistors.

To produce the required balance of the component signals in the feedback signal which is applied to the source input the filter means preferably comprise respective band pass and band attenuation filters through which the component signals from the actuator and the transducer respectively are passed.

Where mechanical resonance occurs within a single frequency range, the bank pass filter is arranged so that its pass band is within said frequency range and includes said mechanical resonance, the filter exhibiting substantial attenuation outside its pass band. The band attenuation filter is correspondingly arranged so that its attenuation band is also within this resonance frequency range.

Where mechanical resonance occurs within a number of frequency ranges, the respective filters must, of course, have respective transmission characteristics, exhibiting more than one corresponding pass and attenuation band.

An embodiment of the invention will now be particularly described by way of example, with reference to the accompanying drawings, in which:

FIG. 1 is a schematic circuit diagram of a control system of the invention, and;

FIG. 2a and 2b illustrate the transmission characteristics of filters used in the circuit of FIG. 1.

Referring to the drawings, FIG. 1 shows an electric motor 2, which is powered from a variable output amplifier 4. A tachometer generator 6 is driven to move with the motor 2 by way of a coupling shaft 8, an extension 10 of which is adapted to drive a load 12 under control by the system. The output from the generator 6 will be a signal representative of the rotation rate of the motor 2.

The motor 2, in addition, is arranged to form one arm of a bridge circuit, the remaining arms of which are constituted by the resistors R12, R14 and impedance R16. The output of this bridge circuit, derived between the motor end of impedance R16 and a point intermediate resistors R12 and R14 comprises the back e.m.f. of the motor 2 and will also be representative of the rate of rotation of this motor.

The output signal from the generator is passed through a band attenuation filter 20 having transmission characteristics shown in FIG. 2a. This filter 20 is arranged to provide attenuation of the generator output signal over the frequency range within which mechanical resonance occurs in the system comprising, inter alia, the motor 2, the generator 6, and the coupling shafts 8 and 10. The mechanical resonance component in the output signal from the generator 6 will produce spurious operation of the servo system; the transmission characteristics of the filter 20 are accordingly arranged so that the minimum of this resonance component is passed for injection into the input of the amplifier 4. To compensate for the rotation rate signal lost in the filter 20 within the resonance frequency range, the rate signal from the motor 2 is passed through a band pass filter 22 having transmission characteristics shown in FIG. 2b. This allows the rate signal from the motor 2 to pass to the amplifier 4 only within the attenuation band of filter 20 and produces substantial attenuation over the frequency ranges outside the resonance frequency band.

The component signals passed through the filters 20 and 22 are combined in a summing network comprising resistors R26 and R28 to produce a total feedback input to the amplifier 4 which is representative of the rotation rate of the motor 2, but free of unwanted components brought about by mechanical resonance. To produce such a representative feedback signal the outputs of the filters 20 and 22 respectively are arranged to be in the ratio of the inertias or the referred inertias, as hereinbefore defined, of the generator 6 and the motor 2. This is conveniently arranged by having the Q values of the filters equivalent to this ratio.

To prevent any interruption of the feedback signal over the frequency response range of the servo system, and particularly over the mechanical resonance frequency range, the cut-off slopes of the filters 20, 22 are arranged not to be excessively steep so that matching and overlapping of the responses to produce a substantially flat overall response is not too critical and can be obtained reasonably easily. A Q value of 10 has been found suitable in this case.

A demand signal representative of the rotation rate demanded of the motor 2 is fed to the amplifier 4 through a resistor R30. The demand signal is "backed off" against the feedback signal to produce an error signal which is applied to the amplifier input. The demand signal is derived from a demand unit 32, such as a tachometer generator or suitably energized potentiometer, preferably mechanically biassed to a central position giving zero output.

It will be appreciated that, while the system described is a rate responsive zero system wherein dynamic equilibrium is achieved when the error signal is reduced to zero, it is equally applicable to the case where a rate signal is used to stabilize a position responsive system. The invention also is applicable to non-electrical servo systems such as hydraulic servo systems.

What is claimed is:

1. Servo control system comprising in combination:
an electric actuator motor
means providing a demand signal representative of a response demanded of the actuator motor,
a single rate responsive electromechanical transducer coupled directly to the actuator motor and providing a first component signal,
impedance means connected to the motor and providing a second component signal proportional to the back e.m.f. of the motor, both said first and second signals being representative of the actual rate of motor movement in response to the demand signal,
filter means passing to the respective component signals and providing a feedback signal containing a greater proportion of the component signal from the actuator motor within any frequency ranges in which mechanical resonance occurs in the system and a greater proportion of the component signal from the transducer within frequency ranges devoid of such mechanical resonance, and
a source responsive to the demand signal and to the feedback signal and effective to power the actuator motor.

2. Servo control system comprising in combination:
an electrical motor
means providing a demand signal representative of a response demanded of the actuator motor,
an electromechanical transducer coupled directly to the actuator motor and providing a first electrical signal representative of the rate of operation of the actuator motor,
impedance means connected to the actuator motor and providing a second electrical signal proportional to the back e.m.f. of the motor and representative of the rate of operation of the latter
a band attenuation filter passing the first signal, said filter attenuating said signal within any frequency range within which mechanical resonance occurs in the system, but transmitting said signal outside said range, a band pass filter passing the second signal, said filter transmitting said signal within any said frequency range within which mechanical resonance occurs, and attenuating said signal outside said range,
means combining the first and second signals so that the filtered signals substantially compensate each other at resonance to provide a resultant feedback signal, and
a source responsive to the demand signal and to the feedback signal to power the actuator motor.

3. System as claimed in claim 1, including means combining the component signals so that they substantially complement each other at resonance whereby the resulting feedback signal is substantially free of resonance components.

4. System as claimed in claim 1 in which, within frequency ranges containing mechanical resonances, the component signals are combined with relative magnitudes which are in the ratio of the inertias of the actuator and the inertia, or referred inertia, of the transducer.

5. System as claimed in claim 1, in which the feedback signal is constituted wholly by the component signal from the tachometer generator in said frequency ranges devoid of mechanical resonance.

6. System as claimed in claim 1, in which the filter means comprise respective band pass and band attenuation filters through which the component signals from the actuator and the transducer respectively are passed, the pass and attenuation bands of the respective filters including the resonance frequencies of the system.

7. System as claimed in claim 2, in which the signal combining means are effective, within said frequency range containing mechanical resonance, to combine the two filtered signals with relative magnitudes which are in the ratio of the inertia of the actuator to the inertia, or referred inertia, of the transducer.

* * * * *